(12) United States Patent
Tarng et al.

(10) Patent No.: US 8,163,078 B2
(45) Date of Patent: *Apr. 24, 2012

(54) PIGMENT SPACING

(75) Inventors: Ming-Ren Tarng, Irvine, CA (US); Kim Chu, Monterey Park, CA (US); Mark Steffenhagen, Aliso Viejo, CA (US); Shaune Friedman, San Clemente, CA (US)

(73) Assignee: Behr Process Corporation, Santa Ana, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/777,914

(22) Filed: May 11, 2010

(65) Prior Publication Data

US 2010/0218702 A1  Sep. 2, 2010

Related U.S. Application Data

(63) Continuation of application No. 12/346,407, filed on Dec. 30, 2008, now Pat. No. 7,727,323, which is a continuation of application No. 10/914,594, filed on Aug. 9, 2004, now Pat. No. 7,482,054.

(51) Int. Cl.
  *C04B 14/00* (2006.01)
  *C09C 1/04* (2006.01)
  *C09C 1/36* (2006.01)
(52) U.S. Cl. ........................ 106/428; 106/436
(58) Field of Classification Search ................ 106/428, 106/436, 437; 524/205, 612
See application file for complete search history.

(56) References Cited

U.S. PATENT DOCUMENTS

| | | | |
|---|---|---|---|
| 4,771,086 A | 9/1988 | Martin | |
| 4,895,900 A | 1/1990 | Sukejima et al. | |
| 4,927,464 A | 5/1990 | Cowie | |
| 5,068,056 A * | 11/1991 | Robb | 516/90 |
| 5,115,457 A | 5/1992 | Lewandowski et al. | |
| 5,338,354 A | 8/1994 | Melville et al. | |
| 5,385,960 A | 1/1995 | Emmons et al. | |
| 5,412,019 A | 5/1995 | Roulstone et al. | |
| 5,509,960 A | 4/1996 | Simpson et al. | |
| 5,534,585 A | 7/1996 | Roulstone et al. | |
| 5,643,592 A | 7/1997 | Jacobson et al. | |
| 5,650,002 A * | 7/1997 | Bolt | 106/438 |
| 5,688,853 A | 11/1997 | Salter et al. | |
| 5,770,310 A | 6/1998 | Noguchi et al. | |
| 5,886,069 A | 3/1999 | Bolt | |
| 5,976,237 A | 11/1999 | Halko et al. | |

(Continued)

FOREIGN PATENT DOCUMENTS

DE  19743841 B1  4/1999

(Continued)

OTHER PUBLICATIONS

Office Action for Chinese Patent Application No. 200580027109.3, Issued Apr. 24, 2009, 6 Pages.

(Continued)

*Primary Examiner* — Anthony J Green
*Assistant Examiner* — Pegah Parvini
(74) *Attorney, Agent, or Firm* — Rathe Lindenbaum LLP

(57) ABSTRACT

An improved pigment spacing composition and method of manufacture. A coating composition wherein the pigment particles are spaced more uniformly resulting in improved coating properties. In another embodiment, the present invention relates to a composition having nanoparticles interacting with pigmentary titanium dioxide to provide for more uniform spacing of the titanium dioxide.

11 Claims, 3 Drawing Sheets

U.S. PATENT DOCUMENTS

| | | | |
|---|---|---|---|
| 6,005,044 | A | 12/1999 | Karl et al. |
| 6,040,360 | A | 3/2000 | Menovcik et al. |
| 6,040,913 | A | 3/2000 | Johnson |
| 6,080,800 | A | 6/2000 | Frey et al. |
| 6,080,802 | A | 6/2000 | Emmons et al. |
| 6,086,668 | A | 7/2000 | Farneth et al. |
| 6,143,064 | A | 11/2000 | Virtanen |
| 6,200,375 | B1 | 3/2001 | Guez et al. |
| 6,200,674 | B1 | 3/2001 | Kumar et al. |
| 6,218,012 | B1 | 4/2001 | Rota et al. |
| 6,261,691 | B1 | 7/2001 | Atarashi et al. |
| 6,337,362 | B1 | 1/2002 | Reynolds et al. |
| 6,362,121 | B1 * | 3/2002 | Chopin et al. ................... 502/2 |
| 6,413,306 | B1 | 7/2002 | Kraiter et al. |
| 6,492,435 | B1 | 12/2002 | Miyamoto et al. |
| 6,576,051 | B2 | 6/2003 | Bardman et al. |
| 6,667,360 | B1 | 12/2003 | Ng et al. |
| 6,727,309 | B1 | 4/2004 | Paiva et al. |
| 6,740,312 | B2 | 5/2004 | Chopin et al. |
| 6,743,286 | B2 | 6/2004 | Wen et al. |
| 7,482,054 | B2 | 1/2009 | Tarng et al. |
| 7,727,323 | B2 | 6/2010 | Tarng et al. |
| 2002/0028867 | A1 | 3/2002 | Cottis |
| 2002/0112644 | A1 | 8/2002 | Nakamura et al. |
| 2003/0018103 | A1 | 1/2003 | Bardman et al. |
| 2003/0024437 | A1 | 2/2003 | Wen et al. |
| 2003/0089278 | A1 | 5/2003 | Bettler et al. |
| 2003/0144399 | A1 | 7/2003 | Matta et al. |
| 2003/0176550 | A1 | 9/2003 | Rediske et al. |
| 2003/0212187 | A1 | 11/2003 | Cottis |
| 2003/0219391 | A1 | 11/2003 | Liew et al. |
| 2004/0068035 | A1 | 4/2004 | Paiva et al. |
| 2004/0202601 | A1 | 10/2004 | Wen et al. |
| 2006/0030656 | A1 | 2/2006 | Tarng et al. |
| 2007/0221097 | A1 | 9/2007 | Tarng et al. |

FOREIGN PATENT DOCUMENTS

| | | |
|---|---|---|
| EP | 0 402 932 A1 | 12/1990 |
| EP | 0 549 145 A1 | 6/1993 |
| EP | 0573150 A2 | 12/1993 |
| EP | 0 615 534 B1 | 9/1994 |
| EP | 0 615 535 B1 | 9/1994 |
| EP | 0 625 541 B1 | 11/1994 |
| EP | 0861299 B1 | 4/2000 |
| EP | 1 070 739 A2 | 1/2001 |
| EP | 1 270 687 A2 | 1/2003 |
| GB | 1 352 618 | 5/1974 |
| GB | 1 532 521 | 11/1978 |
| JP | 07149520 * | 6/1995 |
| WO | WO 97/18268 | 5/1997 |

OTHER PUBLICATIONS

Office Action for Canadian Patent Application No. 2,576,670, Issued May 6, 2010, 1 Page.
Office Action for Canadian Patent Application No. 2,576,670, Issued Aug. 12, 2009, 1 Page.
Office Action for Indian Patent Application No. 353/KOL NP 2007, issued Feb. 25, 2009, 1 Page.
Office Action for Australian Patent Application No. 2005277928, Issued Apr. 24, 2008, 2 Pages.
International Search Report for PCT Application No. PCT/US2005/022677, Issued Feb. 3, 2006, 5 Pages.
Written Opinion of the International Searching Authority from PCT Application No. PCT/US2005/022677, Issued Feb. 3, 2006, 5 Pages.
Office Action for Chinese Patent Application No. 09520886450, Issued Oct. 30, 2006, 2 Pages.
Communication Pursuant to Article 96(2) EPC for European Patent Application No. 05 789 267.1, issued Jun. 25, 2007, 7 Pages.
Extended European Search Report for European Patent Application No. 10153642.3, issued May 26, 2010, 7 Pages.
Office Action for Mexican Patent Application No. MX/a/2007/001293, Issued Apr. 17, 2009, 2 Pages.
Dorr, H. & Holzinger, F., Kronos Titandioxid in Dispersionsfarben, (1989), S. 29, 30, 32 bis 34.
EPO, Communication of a Notice of Opposition, Jan. 14, 2011.
Kirk-Othmer, Encyclopedia of Chemical Technology, vol. 14 (1967), S. 468, 472.
Machine Translation of DE19743841B1 (Sondermann et al.).
Machine Translation of Dorr, H. & Holzinger, F., Kronos Titandioxid in Dispersionsfarben, (1989), S. 29, 30, 32 bis 34.
Machine Translation of EPO, Communication of Notice of Opposition, Jan. 14, 2011.
Machine Translation of Schmitz, J. et al., Oleochemisch versus polyfunktionell, Farbe & Lack (1998), S. 22 bis 28.
Schmitz, J. et al., Oleochemisch versus polyfunktionell, Farbe & Lack (1998), S. 22 bis 28.

* cited by examiner

PIGMENT SPACING

CROSS REFERENCE TO RELATED APPLICATIONS

This application is a continuation of U.S. patent application Ser. No. 12/346,407, filed on Dec. 30, 2008, now U.S. Pat. No. 7,727,323, which is a continuation of U.S. patent application Ser. No. 10/914,594 filed on Aug. 9, 2004, now U.S. Pat. No. 7,482,054. Both applications are incorporated herein by reference in their entirety.

FIELD OF THE INVENTION

The present invention is generally related to controlling pigment spacing in a coating composition. More particularly, the present invention is related to achieving an improved $TiO_2$ spacing in a paint, such as by using nanoparticles of ZnO, $SiO_2$, or $Al_2O_3$ of differing size and density distribution.

BACKGROUND OF THE INVENTION

Pigments such as titanium dioxide are a common component of coating compositions, particularly paint. Paint generally comprises a film-forming material or binder, a pigment, and a carrier or solvent which evaporates to leave the solids as a coating on a substrate.

The pigment is generally partially or wholly suspended or dissolved in the carrier. Film formation of paint occurs when the paint is applied to a substrate and the carrier evaporates. During this process, the particles of pigment and binder come closer together. As the last vestiges of liquid evaporate, capillary action draws the binder particles together with great force, causing them to fuse and bind the pigment into a continuous film. This process is often referred to as coalescence.

Thus, the spacing and orientation in the carrier of the pigment particles relative to each other, and the various other solids, is essentially retained when the solid film is formed on the substrate. Flocculation and settling of the pigment phase are particularly undesirable. The pigments tend to cling together as packed pigment particles by agglomerating or clustering and then tend to resist subsequent redispersion by agitation, thus degrading the hiding power of the resulting paint. Hiding power is among one of the most important attributes of paint, and hiding power is determined particularly in white paint by the light scattering effectiveness of the pigment. The light scattering effectiveness of the pigment is in turn highly dependent on the spacing arrangement of the pigment in the dried coating as well as the particle sizes. Many different methods are known in the art for affecting and controlling the sizes of the pigment particles; however, this has proven to be ineffective in controlling light scattering sufficiently.

The pigment which is most widely used in paint is titanium dioxide. However, titanium dioxide is relatively expensive in comparison to the costs of other components used in paint. As such, there is a need to maximize the beneficial aspects of titanium dioxide, while minimizing the amount used. Enhanced light scattering occurs when the titanium dioxide pigment particles have a diameter of about 200 to 300 nm and are uniformly spaced about the same distance apart. Most commonly, particulate $TiO_2$ in the range of 100 nm to 400 nm is utilized in conventional paint.

Various techniques have been attempted and used in the art to promote an even spacing and distribution of the pigment in the coating. A number of pigments have been found to function as "extender" pigments, wherein the extended pigments are alleged to function in mechanically spacing the opacifying or "prime" pigments. However, the flocculation forces present during the drying of paint still result in the presence of clusters and flocs of pigment particles. Thus, even if total deaggregation is accomplished in the dispersion process, a random distribution of pigment particles will not approach the theoretical optimum that an ideally spaced distribution would achieve.

Regardless of the technique, prior art coatings do not achieve a level of opacity which approaches that predicted theoretically. Thus, there is a long felt need for further improvement, such as a more efficient packing arrangement of $TiO_2$ particles in a coating formed on a substrate.

SUMMARY OF THE INVENTION

The present invention provides methods and compositions for coatings wherein the $TiO_2$ particles exhibit improved spacing over conventional paint formulations. Without limiting the scope of the invention, it is believed that the nanoparticle-sized pigment particles (specifically nano-ZnO) have an affinity for the surface of pigmentary $TiO_2$ particles. It is therefore believed that the nano ZnO particles effectively are disposed around and associated with the $TiO_2$ particle so that the efficiency of the $TiO_2$ particles arrangement increases; i.e., the overall stability of $TiO_2$ pigment particles on drying is improved, thus improving properties such as tint strength and hiding power (contrast ratio). It is believed that the nano ZnO particles are interacting with the $TiO_2$ to form a more efficient dispersion.

In one embodiment, a method is provided for producing a titanium dioxide particle dispersion having nano-particle pigments interacting with the titanium dioxide to provide for more efficient packing arrangement of the titanium dioxide. In a preferred embodiment, the present invention relates to a paint composition of titanium dioxide, and a nanoparticle pigment, such as ZnO, and also a binder and a dispersant, along with additives as known in the art for formulating paint. The nanoscale zinc oxide, silicone dioxide, and aluminum oxide provide for a more uniform dispersment of the titanium dioxide when the paint dries to form a coating on a substrate.

DETAILED DESCRIPTION OF THE PREFERRED EMBODIMENTS

It is known that efficient spacing of $TiO_2$ particles in a paint produces a paint that has improved tint strength and hiding power. However, in most paints, upon drying, the $TiO_2$ pigment particles agglomerate and thus reduce the efficiency of the $TiO_2$ particles. This agglomeration of $TiO_2$ particles yields paints that have lower tint strength and hiding power.

It is believed in accordance with the principles of the present invention that the nanoparticle-sized pigment particles (specifically nano-ZnO) are uniformly distributed within the paint matrix. Through this uniform distribution of particles, higher tint strength and hiding power are observed. This uniform distribution is achieved through the interaction of the surface modified/treated of the $TiO_2$ (as supplied by the $TiO_2$ manufacturer) and nano particles. The $TiO_2$ used in the paint has metal oxide surface treatment along with oligomeric/polymeric dispersant; which keeps the $TiO_2$ particles from flocculating to a certain extent in the dry film. Addition of surface treated nano particles (treated in house with an oligomeric/polymeric dispersant) further enhances the spacing of $TiO_2$. Typically, addition of untreated nano particles (ex. ZnO) to a paint would flocculate the $TiO_2$ and make the paint useless. However, with the proper pretreatment of both $TiO_2$ and nano particles, electro-steric interactions prevent flocculation from occurring in the wet paint and during the paint drying process. By preventing the particles from flocculating, optimal $TiO_2$ spacing is achieved. Although prior art has shown some $TiO_2$ spacing with extender pigments, none has been known to produce as effective results.

Figure 1:
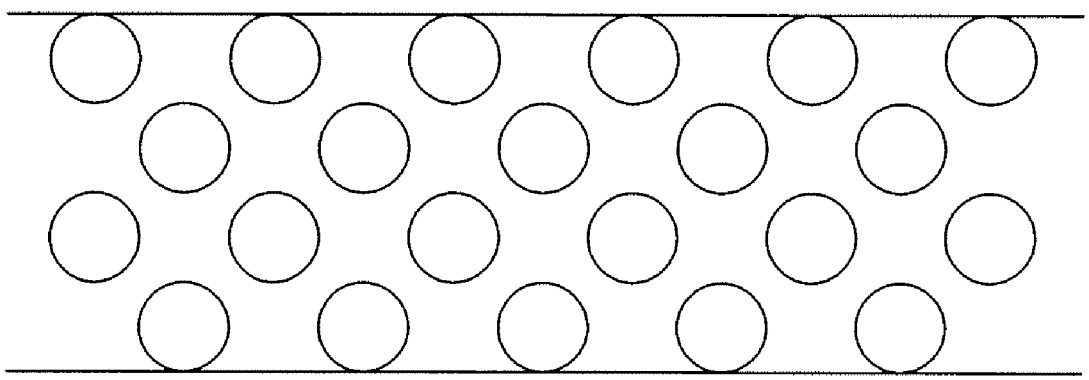
FIG. 1 represents the ideal spacing of $TiO_2$ particles.
Figure 2:
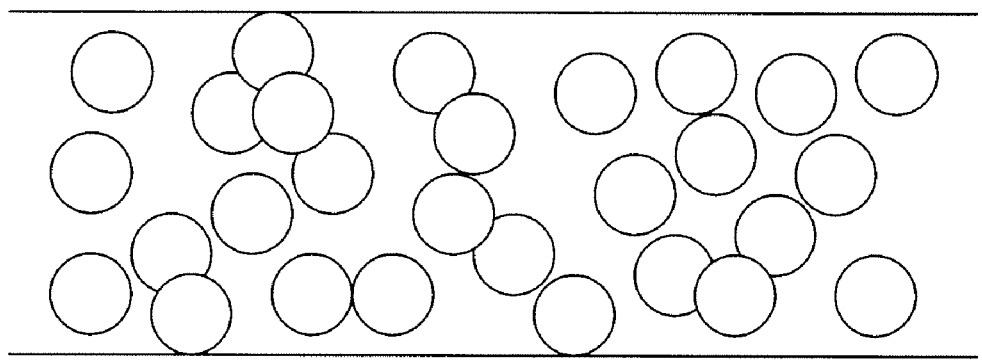
FIG. 2 is a representation of how $TiO_2$ particles are spaced in a typical prior art paint.
Figure 3:
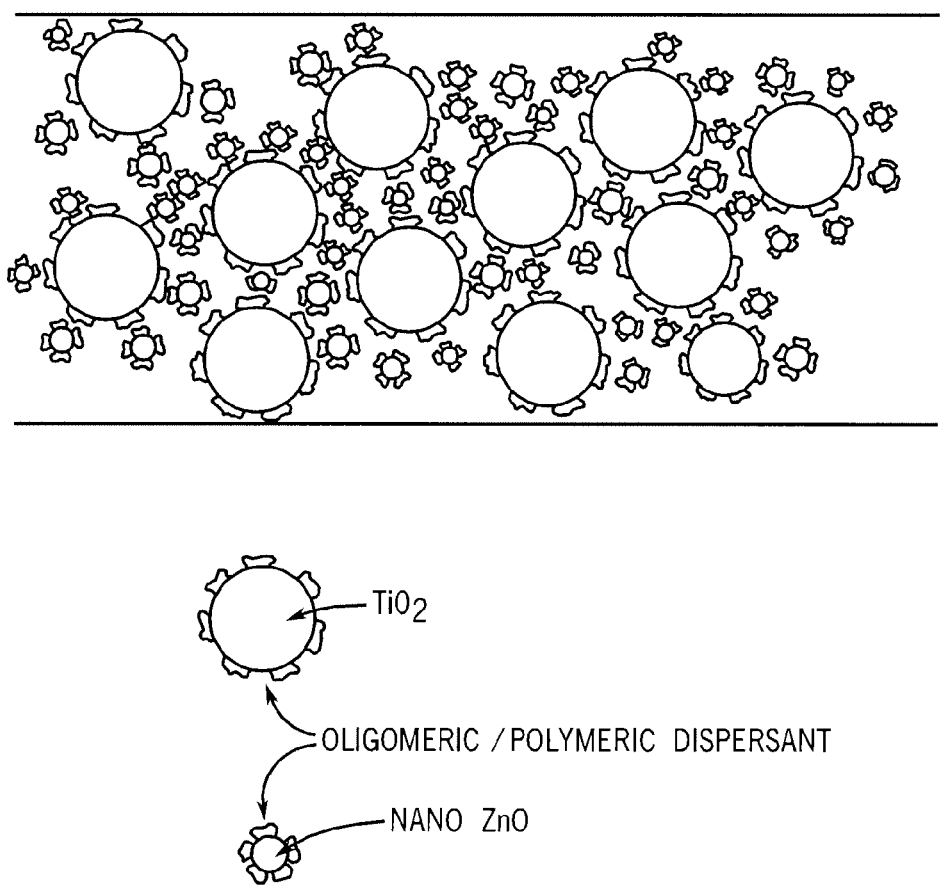
FIG. 3 is a representation of one embodiment of the present invention showing nano ZnO particles in association with $TiO_2$ particles.

The ideal spacing of $TiO_2$ is illustrated in FIG. 1. The $TiO_2$ particles are spaced as efficiently as can be, allowing for maximum scattering of light, and thus, providing the maximum hiding power. FIG. 2 illustrates what is believed to occur in current coating formulations. The particles are not spaced evenly (some are agglomerated); and therefore light scattering is not optimum and hiding power suffers. FIG. 3 illustrates one possible spacing arrangement in accordance with the principles of a preferred form of the present invention. It is believed that the nanoparticle-sized extender pigment particles, for example illustrated as ZnO, have an affinity for the surface of $TiO_2$ particles that aides in spacing the $TiO_2$ particles. Thus, the nanoparticles and $TiO_2$ interact by a mechanism resulting in improved spacing of the $TiO_2$ particles. Although both pigmentary and nano ZnO show improvements in tint strength (up to 30%); the nano ZnO particle effect is more efficient. Nano ZnO particles are also more efficient at improving hide. Although not ideal, the spacing in FIG. 3 has $TiO_2$ particles which are still spaced better than in typical prior art paint systems; thus, the paint provides much improved hiding power. It must be appreciated that FIG. 3 is non-limiting, and that a multitude of various spacing arrangements and morphologies, providing improved spacing and resulting improved hiding power, are within the full scope of the present invention.

The positive attributes of nano ZnO particles in paints is resin system dependent, especially for tint strength and gloss observations. Thus, various resin systems can be used as known in the art. The most profound and preferred results are seen with acrylic resin systems (both self-crosslinking and non self-crosslinking). Contrast ratio increases are observed for all types of resin systems.

Similarly, various pigmentary $TiO_2$ particles respond differently to the addition of nano ZnO particles. Thus, various pigmentary $TiO_2$ particles can be used in accordance with the principles of the present invention. Commercial sample 1, a $TiO_2$ product sold under the trade name Kronos 4311 by KRONOS Worldwide, Inc., located at 16825 Northcase Drive, Suite 1200, Houston, Tex. 77210-4272, responds well in terms of tint strength and contrast ratio and is a preferred component. Commercial sample 3, sold under the trade name Tiona RCS-2 by Millennium Chemicals, Inc., located at 20 Wright Avenue, Suite 100, Hunt Valley, MD. 21030, performs similarly, but it is not as efficient. Commercial sample 2, sold under the trade name Tiona 596S, also by Millennium Chemicals, Inc., located at 20 Wright Avenue, Suite 100, Hunt Valley, MD. 21030, has only minimal improvements when compared to Commercial sample 1 and Commercial sample 3.

Various dispersants may be used as known in the art.

Additional $TiO_2$ particle content in systems in accordance with the principles of the present invention increases the tint strength (up to 40%); however, this improvement is not significant over paints without additional $TiO_2$ particles. Hide is significantly improved with increasing $TiO_2$ particle content. Thus, in one embodiment of the present invention, additional $TiO_2$ particle content is used as compared to conventional formulations.

EXAMPLES

A master batch of paint prepared in accordance with the principles of the present invention was made holding a portion of water. The batch was then apportioned, and the proper amounts of nanoparticles (see examples below) and water were post-added. Various components of the paint were varied depending on the focus of the experiment. Tint strength and contrast ratio of each sample were evaluated. Tables 1A-G list the basic formulation for Paints A-G, respectively. Table 1.

TABLE 1A

Paint A (High Gloss: Self-Crosslinking 100% Acrylic)
A paint coating composition comprising of the following raw materials:

| Generic Description | wt % Range |
|---|---|
| Self-Crosslinking Acrylic Polymer | 48-52 |
| TiO2 Slurry | 31-35 |
| Water | 4-8 |
| Ethylene Glycol | 2-6 |
| Associative High Shear Rheology Modifier | 2-6 |
| Alkyl Ester Coalescing Agent | 1.5-3.5 |
| Hydrophobic Copolymer Dispersant | 0.5-2.0 |
| Phosphated Co-ester Surfactant | 0.1-0.4 |
| Mildewcide | 0.1-0.4 |
| Silicone Defoamer | 0.1-0.3 |
| Amino Alcohol Additive | 0.1-0.3 |
| Non-ionic HEUR Low Shear Rheology Modifier | 0.1-0.3 |
| Silicone Defoamer | 0.1-0.3 |
| In-can Biocide | 0.05-0.1 |
| Silicone based Anti-mar Additive | 0.05-0.1 |

TABLE 1B

Paint B (Semi-Gloss: 100% Acrylic - Low PVC)
A paint coating composition comprising of the following raw materials:

| Generic Description | wt % Range |
|---|---|
| Acrylic Polymer | 37-41 |
| TiO2 Slurry | 27-31 |
| Water | 13-17 |
| Opaque Polymer | 4-8 |
| Associative High Shear Rheology Modifier | 2-6 |
| Ethylene Glycol | 1.5-4.5 |
| Non-ionic HEUR Low Shear Rheology Modifier | 0.5-2.5 |
| Texanol | 0.5-1.5 |
| Hydrophobic Copolymer Dispersant | 0.5-1.5 |
| Feldspar (Nepheline Syenite) | 0.2-0.8 |
| Butyl Carbitol | 0.2-0.8 |
| Non-ionic Surfactant | 0.2-0.8 |
| Mildewcide | 0.2-0.8 |
| Attapulgite Clay | 0.1-0.6 |
| Silicone Defoamer | 0.1-0.4 |
| Mineral Oil Defoamer | 0.1-0.4 |
| In-can Biocide | 0.05-0.2 |

TABLE 1C

Paint C (High Gloss - Styrene Acrylic)
A paint coating composition comprising of the following raw materials:

| Generic Description | wt % Range |
| --- | --- |
| Styrene-Acrylic Polymer | 53-57 |
| TiO2 Slurry | 30-34 |
| Butyl Carbitol | 2-6 |
| Ethylene Glycol | 2-6 |
| Associative High Shear Rheology Modifier | 1-4 |
| Texanol | 1-4 |
| Water | 1-4 |
| Non-ionic Phosphate Ester Surfactant | 0.2-0.6 |
| Amino Alcohol Additive | 0.2-0.6 |
| Mildewcide | 0.1-0.5 |
| Silicone Defoamer | 0.1-0.5 |
| Hydrophobic Copolymer Dispersant | 0.1-0.5 |
| In-can Biocide | 0.05-0.15 |
| Non-ionic HEUR Low Shear Rheology Modifier | 0.05-0.15 |
| Silicone based Anti-mar Additive | 0.05-0.15 |

TABLE 1D

Paint D (Flat - PVA)
A paint coating composition comprising of the following raw materials:

| Generic Description | wt % Range |
| --- | --- |
| TiO2 Slurry | 24-28 |
| Poly-vinyl Acrylic Emulsion | 24-28 |
| Water | 14-18 |
| Calcined Kaolin | 8-12 |
| Opaque Polymer | 7-11 |
| Calcium Carbonate | 3-6 |
| Ethylene Glycol | 1-4 |
| Calcined Diatomaceous Earth | 1-4 |
| Non-ionic HEUR Low Shear Rheology Modifier | 0.5-1.5 |
| Associative High Shear Rheology Modifier | 0.5-1.5 |
| Mildewcide | 0.2-0.6 |
| Non-ionic Surfactant | 0.2-0.6 |
| Mineral Oil defoamer | 0.2-0.6 |
| Hydrophobic Copolymer Dispersant | 0.2-0.6 |
| Modified HEC (Modified Hydroxyethylcellulose) | 0.2-0.6 |
| Attapulgite Clay | 0.2-0.6 |
| Amino Alcohol Additive | 0.2-0.6 |
| In-can Biocide | 0.05-0.25 |

TABLE 1E

Paint E (Semi-gloss: VAE)
A paint coating composition comprising of the following raw materials:

| Generic Description | wt % Range |
| --- | --- |
| Vinyl Acetate-Ethylene Emulsion | 38-42 |
| TiO2 Slurry | 34-38 |
| Water | 9-13 |
| 3% HEC | 5-9 |
| Propylene Glycol | 1-4 |
| Texanol | 0.5-1.5 |
| Hydrophobic Copolymer Dispersant | 0.5-1.5 |
| Mildewcide | 0.5-1.5 |
| Mineral Oil Defoamer | 0.2-0.8 |
| Amino Alcohol Additive | 0.1-0.4 |
| Phosphasted Co-ester Surfactant | 0.1-0.4 |
| In-can Biocide | 0.05-0.2 |

TABLE 1F

Paint F (Satin: 100% Acrylic - Mid PVC)
A paint coating composition comprising of the following raw materials:

| Generic Description | wt % Range |
| --- | --- |
| Acrylic Polymer | 35-39 |
| TiO2 Slurry | 27-31 |
| Water | 11-15 |
| Feldspar (Nepheline Syenite) | 4-8 |
| Opaque Polymer | 4-8 |
| Associative High Shear Rheology Modifier | 2-4 |
| Ethylene Glycol | 2-4 |
| Texanol | 0.5-2 |
| Non-ionic HEUR Low Shear Rheology Modifier | 0.5-2 |
| Mineral Oil Defoamer | 0.3-1 |
| Attapulgite Clay | 0.3-1 |
| Butyl Carbitol | 0.3-1 |
| Non-ionic Surfactant | 0.3-1 |
| Hydrophobic Copolymer Dispersant | 0.2-0.8 |
| Mildewcide | 0.2-0.8 |
| In-can Biocide | 0.05-0.2 |

TABLE 1G

Paint G (Flat: 100% Acrylic - High PVC)
A paint coating composition comprising of the following raw materials:

| Generic Description | wt % Range |
| --- | --- |
| Acrylic Polymer | 28-32 |
| TiO2 Slurry | 22-26 |
| Water | 11-15 |
| Calcined Kaolin | 9-13 |
| Feldspar (Nepheline Syenite) | 7-10 |
| Opaque Polymer | 1.5-4 |
| Calcium Carbonate | 1.5-4 |
| Associative High Shear Rheology Modifier | 1-3 |
| Ethylene Glycol | 1-3 |
| Texanol | 0.5-2 |
| Hydrophobic Copolymer Dispersant | 0.5-2 |
| Non-ionic HEUR Low Shear Rheology Modifier | 0.25-1 |
| Mineral Oil Defoamer | 0.25-1 |
| Non-ionic Surfactant | 0.2-0.8 |
| Mildewcide | 0.2-0.8 |
| Attapulgite Clay | 0.1-0.6 |
| Amino Alcohol Additive | 0.1-0.6 |
| In-can Biocide | 0.05-0.2 |

Example 1

Nanoparticle Screening

The following nanoparticles were screened in a typical paint formulation: $Al_2O_3$, $SiO_2$, and $ZnO$ (two particle sizes) at two concentration levels, 0.50% and 1.00%. Particle sizes of these nanopigments ranged from ~10-120 nm. TABLE 2 shows the data for the nanoparticle screening tests. The starting Paint A is any conventional white base paint with a PVC of ~23.0. The concentration of nanoparticles is a percentage based on the total formula weight.

Three observations are noted from TABLE 2 first, all of the different nanoparticles studied yield an increase in tint strength and contrast ratio when formulated into Paint A (as opposed to Paint A without nanopigmentation). Second, improved tint strength and contrast ratio are observed with various particles sizes (~10-120 nm). Lastly, increasing the concentration of nanoparticles (0.5% vs. 1.0%) yields an increase in tint strength and contrast ratio. From this screening study, Paint A with added nano ZnO (~60 nm particle size) at a concentration of 0.5% yielded the highest increase in tint strength (28.75%) and contrast ratio (0.75%). One skilled the art would appreciate that while the contrast ratio increase is small, a mere increase of 0.40% will show a noticeable visual improvement in hiding power.

TABLE 2

| Sample | Nano-particle Type | Nano-particle Size | [Nano-particle]* | Tint Strength Increase | Contrast Ratio Increase |
|---|---|---|---|---|---|
| Paint A | Al$_2$O$_3$ | ~10 nm | 0.5% | 2.40% | 0.70% |
|  |  |  | 1.0% | 6.80% | 0.40% |
| Paint A | SiO$_2$ | ~20 nm | 0.5% | 5.70% | 0.65% |
|  |  |  | 1.0% | 14.50% | 0.50% |
| Paint A | ZnO | ~60 nm | 0.5% | 28.75% | 0.75% |
|  |  |  | 1.0% | 22.70% | 0.45% |
| Paint A | ZnO | ~120 nm | 0.5% | 20.70% | 0.35% |
|  |  |  | 1.0% | 27.10% | 0.30% |

*Based on total formula weight.

Example 2

Nanoparticle Concentration Screening

In this study, the concentration range of nano ZnO (~60 nm particle size) was examined in Paint A. The concentrations of nano ZnO examined were 0.05%, 0.10%, 0.25%, 0.50%, 1.00%, 1.50%, 2.50%, and 5.00%. TABLE 3 shows the tint strength and contrast ratio data for increasing the nano ZnO concentration in Paint A. The concentration of nano ZnO is expressed as a percentage based on total formula weight.

The data in TABLE 3 illustrate that as the concentration of nano ZnO (particle size of ~60 nm) is increased in the base Paint A (0.05-5.00%), the tint strength and contrast ratio increase (as opposed to Paint A without nanopigmentation). The optimum use level of nano ZnO (particle size ~60 nm) is 0.50%, yielding a tint strength increase of 28.75% and a contrast ratio of 0.75%.

TABLE 3

| Sample | Nano-particle Type | Nano-particle Size | [Nano-particle]* | Tint Strength Increase | Contrast Ratio Increase |
|---|---|---|---|---|---|
| Paint A | ZnO | ~60 nm | 0.05% | 1.50% | 0.35% |
|  |  |  | 0.10% | 3.00% | 0.30% |
|  |  |  | 0.25% | 14.10% | 0.35% |
|  |  |  | 0.50% | 28.76% | 0.75% |
|  |  |  | 1.00% | 22.70% | 0.45% |
|  |  |  | 1.50% | 23.00% | 0.40% |
|  |  |  | 2.50% | 20.70% | 0.35% |
|  |  |  | 5.00% | 16.25% | 0.20% |

*Based on total formula weight.

Example 3

Blending of Nanoparticles Study

This study examines the effect of blending nanoparticles of different composition and different particle sizes into a typical base paint formulation (Paint B in this case). The nanoparticles studied were ZnO (~60 nm and ~120 nm particle size) and Al$_2$O$_3$ (·50 nm particle size). TABLE 4 lists the contrast ratio results for Paint B with various added blends of nanopigmentation. The nanoparticles are examined alone, and then as the blends listed in TABLE 4. The concentration for each of the different nanoparticles was 0.50% based on total formula weight. The base Paint B is a conventional, well known paint with a PVC of ~28.0.

TABLE 4 illustrates that when the nanoparticles are used alone or in blends of equal ratios in base Paint B, contrast ratio is increased (opposed to Paint B without nanopigmentation). This increase in contrast ratio is noted in all of the listed cases, whether the nanopigments are of approximately equal size (nano ZnO, ~60 nm blended with nano Al$_2$O$_3$, ~50 nm) or are of different sizes (either nano ZnO, ~60 nm blended with nano ZnO, ~120 nm or nano Al$_2$O$_3$, ~50 nm blended with nano ZnO, ~120 nm). In this study, the largest improvement in contrast ratio was observed, 0.55%, with the combination of the base Paint B with a blend of nano ZnO (~120 nm) and nano Al$_2$O$_3$ (~50 nm).

TABLE 4

| Sample | Nanoparticle Type | Nanoparticle Size | [Nanoparticle]* | Contrast Ratio Increase |
|---|---|---|---|---|
| Paint B | ZnO | ~60 nm | 0.50% | 0.20% |
| Paint B | ZnO | ~120 nm | 0.50% | 0.45% |
| Paint B | Al$_2$O$_3$ | ~50 nm | 0.50% | 0.40% |
| Paint B- Blend | ZnO | ~60 nm | 0.50% | 0.35% |
|  | ZnO | ~120 nm | 0.50% |  |
| Paint B- Blend | ZnO | ~60 nm | 0.50% | 0.20% |
|  | Al$_2$O$_3$ | ~50 nm | 0.50% |  |
| Paint B- Blend | ZnO | ~120 nm | 0.50% | 0.55% |
|  | Al$_2$O$_3$ | ~50 nm | 0.50% |  |

*Based on total formula weight.

Example 4

Resin Type Screening with Nanoparticles

The following example demonstrates that the most common resin systems typically used in architectural coatings can be used with the nanotechnology described in this patent. The resin systems that were examined in this study were two acrylic resins (one self-crosslinking, one non self-crosslinking), a styrene-acrylic resin, a polyvinyl acrylic (PVA), and a vinyl acetate ethylene (VAE) resin. These commercially available resins were used to make up several conventional base paints as set forth in Table 1, Paint A (23.0 PVC), Paint B (28.0 PVC), Paint C (23.0 PVC), Paint D (51.75 PVC), and Paint E (27.64 PVC). All of these paints were examined with and without 0.50% (based on total formula weight) of nano ZnO (~60 nm particle size). TABLE 5 lists the tint strength and contrast ratio results for Paints A-E.

The data in TABLE 5 illustrates that the effect of spacing with nanoparticles (ZnO ~60 nm in this case) is observed in paints made with different resin compositions. All of the various resin types, acrylic (self-crosslinking), acrylic (non self-crosslinking), styrene-acrylic, PVA, and VAE in Paints A-E all show an improvement in tint strength and contrast ratio (over Paints A-E without nanopigmentation). The most dramatic improvement in tint strength and contrast ratio is observed with additions to base Paint A, which was formulated with a 100% self-crosslinking acrylic resin. Paint A, as modified, shows a 28.75% increase in tint strength and a 0.75% increase in contrast ratio.

TABLE 5

| Sample | Resin Type | Nano-particle Type | Nano-particle Size | [Nano-particle]* | Tint Strength Increase | Contrast Ratio Increase |
|---|---|---|---|---|---|---|
| Paint A | Acrylic (Self x-linking) | ZnO | ~60 nm | 0.50% | 28.75% | 0.75% |
| Paint B | Acrylic (Non x-linking) | ZnO | ~60 nm | 0.50% | 13.20% | 0.80% |
| Paint C | Styrene-Acrylic | ZnO | ~60 nm | 0.50% | 7.10% | 0.30% |
| Paint D | PVA | ZnO | ~60 nm | 0.50% | 3.30% | 0.20% |
| Paint E | VAE | ZnO | ~60 nm | 0.50% | 3.80% | 0.10% |

*Based on total formula weight.

Example 5

Pigmentary $TiO_2$ Screening with Nanoparticles

This study examines several different commercially available pigmentary $TiO_2$ types and their ability to be spaced with nanoparticles (ZnO, ~60 nm particle size in this case) as described in this patent. Three different pigmentary $TiO_2$ products were studied as additives in base Paint A, with and without nanopigmentation (0.50% ZnO, based on total formula weight). The three different $TiO_2$ products studied were Commercial-1, Commercial-2, and Commercial-3 previously described. TABLE 6 lists tint strength and contrast ratio data for these Paints.

The data in TABLE 6 illustrates that an improvement in tint strength and contrast ratio is observed in base Paint A, as modified, with all three commercially available pigmentary $TiO_2$ types. The largest improvement is noted in modified Paint A with $TiO_2$ type Commercial-1, showing an increase in tint strength of 28.75% and contrast ratio increase of 0.75%.

TABLE 6

| Sample | $TiO_2$ | Nano-particle Type | Nano-particle Size | [Nano-particle]* | Tint Strength Increase | Contrast Ratio Increase |
|---|---|---|---|---|---|---|
| Paint A | Commercial 1 | ZnO | ~60 nm | 0.50% | 27.80% | 0.75% |
| Paint A | Commercial 2 | ZnO | ~60 nm | 0.50% | 14.50% | 0.55% |
| Paint A | Commercial 3 | ZnO | ~60 nm | 0.50% | 20.10% | 0.65% |

*Based on total formula weight.

Example 6

Pigmentary $TiO_2$ Concentration Screening with Nanoparticles

This example demonstrates that nanoparticles (ZnO, ~60 nm in this case) can be used to effectively space various levels of pigmentary $TiO_2$ in a typical architectural coatings formulation. Paint A was studied with various added levels of Commercial-1 $TiO_2$; 7.10%, 10.70%, 14.20%, 17.80%, 21.10%, 24.90%, and 28.50% (based on total formula weight) with and without nanopigmentation (0.50% of nano ZnO, ~60 nm). TABLE 6 lists the tint strength and contrast ratio data for these paints.

TABLE 7 illustrates that at every level of pigmentary $TiO_2$ examined, an improvement in tint strength and contrast ratio is observed (as compared to the corresponding paint without nanopigmentation). The largest increase in tint strength and contrast ratio is observed with modified Paint A having 24.90% $TiO_2$ (based on total formula weight) with 0.50% ~60 nm nano ZnO (based on total formula weight); this paint shows a 29.25% increase in tint strength and a 0.90% increase in contrast ratio.

TABLE 7

| Sample | [$TiO_2$]* (Commercial-1) | Nano-particle Type | Nano-particle Size | [Nano-particle]* | Tint Strength Increase | Contrast Ratio Increase |
|---|---|---|---|---|---|---|
| Paint A | 7.10% | ZnO | ~60 nm | 0.50% | 10.00% | 0.60% |
| Paint A | 10.70% | ZnO | ~60 nm | 0.50% | 12.75% | 0.60% |
| Paint A | 14.20% | ZnO | ~60 nm | 0.50% | 19.75% | 0.55% |
| Paint A | 17.80% | ZnO | ~60 nm | 0.50% | 23.00% | 0.65% |
| Paint A | 21.10% | ZnO | ~60 nm | 0.50% | 27.25% | 0.35% |
| Paint A | 24.90% | ZnO | ~60 nm | 0.50% | 29.25% | 0.90% |
| Paint A | 28.50% | ZnO | ~60 nm | 0.50% | 25.25% | 0.40% |

*Based on total formula weight.

Example 7

PVC Variation with Nanopigmentation

This example demonstrates that nanoparticles (ZnO, ~60 nm in this case) can be used to effectively space pigmentary $TiO_2$ in typical architectural paints of varying PVC. Paints of three different PVC's were examined in this study (all with the same resin and $TiO_2$ types) at PVC's ranging from ~28.0-50.50 PVC. TABLE 8 lists the tint strength and contrast ratio improvements for these three paints.

TABLE 8 illustrates that for the PVC range of ~28.0-50.50 PVC, an improvement in tint strength and contrast ratio is noted. The best improvement in this particular study was with modified Paint B (28.10 PVC) with tint strength improved by 5.50% and contrast ratio improved by 0.40%.

TABLE 8

| Sample | PVC | Nano-particle Type | Nano-particle Size | [Nano-particle]* | Tint Strength Increase | Contrast Ratio Increase |
|---|---|---|---|---|---|---|
| Paint B | 28.10 | ZnO | ~60 nm | 0.50% | 5.50% | 0.40% |
| Paint F | 34.90 | ZnO | ~60 nm | 0.50% | 2.40% | 0.45% |
| Paint G | 50.40 | ZnO | ~60 nm | 0.50% | 2.40% | 0.50% |

*Based on total formula weight.

What is claimed is:

1. A process for modifying a paint composition containing titanium dioxide particles, comprising:

dispersing between a 0.05 percent and a 5.0 percent by weight of metal oxide nanoparticles, pre-treated to minimize flocculation, in the paint composition containing the titanium dioxide particles; and interacting the metal oxide nanoparticles and the titanium dioxide particles to form an intervening dispersion of a plurality of metal oxide nanoparticles, the intervening dispersion uniformly distributed around the titanium dioxide particles;

wherein the step of dispersing the metal oxide nanoparticles comprises mixing a first set of metal oxide nanoparticles having a first average particle size and a second set of metal oxide nanoparticles having a second average particle size, the first set of metal oxide nanoparticles and the second set of metal oxide nanoparticles having pre-treated surfaces to minimize flocculation; and further wherein the first average particle size is about 120 nm and the second average particle size is about 60 nm.

2. The process of claim 1, wherein the metal oxide nanoparticles comprise zinc oxide.

3. The process of claim 1, wherein the titanium dioxide particles comprise between about 7.1 and about 28.5 percent by weight of the paint composition.

4. The process of claim 1, wherein the titanium dioxide particles are pre-treated with a metal oxide.

5. The process of claim 4, wherein the titanium dioxide particles are surface treated with a dispersant and the metal oxide nanoparticles are surface treated with a dispersant, and further wherein the metal oxide nanoparticles surface treated with the dispersant and the titanium dioxide particles surface treated with the dispersant undergo electro-steric interactions that prevent flocculation.

6. A process for modifying a paint composition containing titanium dioxide particles, comprising:
dispersing between a 0.05 percent and a 5.0 percent by weight of metal oxide nanoparticles, pre-treated to minimize flocculation, in the paint composition containing the titanium dioxide particles; and
interacting the metal oxide nanoparticles and the titanium dioxide particles to form an intervening dispersion of a plurality of metal oxide nanoparticles, the intervening dispersion uniformly distributed around the titanium dioxide particles;
wherein the step of dispersing the metal oxide nanoparticles comprises mixing a first set of metal oxide nanoparticles having a first average particle size and a second set of metal oxide nanoparticles having a second average particle size, the first set of metal oxide nanoparticles and the second set of metal oxide nanoparticles having pre-treated surfaces to minimize flocculation; and
wherein the first average particle size is about 120 nm and the second average particle size is about 50 nm.

7. A process for modifying a paint composition containing titanium dioxide particles, comprising:
dispersing in the paint composition a first set of metal oxide nanoparticles having a first average particle size, and a second set of metal oxide nanoparticles having a second average particle size, the first set of metal oxide nanoparticles and the second set of metal oxide nanoparticles having pre-treated surfaces to minimize flocculation; and
interacting the first set of metal oxide nanoparticles and the second set of metal oxide nanoparticles with the titanium dioxide particles to form an intervening dispersion of a plurality of metal oxide nanoparticles, the intervening dispersion uniformly distributed around the titanium dioxide particles;
wherein the first average particle size is about 120 nm and the second average particle size is about 60 nm.

8. The process of claim 7, wherein the first metal oxide and the second metal oxide comprise the same metal oxide.

9. The process of claim 7, wherein the first metal oxide and the second metal oxide are different metal oxides.

10. The process of claim 7, wherein the titanium dioxide particles comprise between about 7.1 and about 28.5 percent by weight of the paint composition.

11. A process for modifying a paint composition containing titanium dioxide particles, comprising:
dispersing in the paint composition a first set of metal oxide nanoparticles having a first average particle size, and a second set of metal oxide nanoparticles having a second average particle size, the first set of metal oxide nanoparticles and the second set of metal oxide nanoparticles having pre-treated surfaces to minimize flocculation; and
interacting the first set of metal oxide nanoparticles and the second set of metal oxide nanoparticles with the titanium dioxide particles to form an intervening dispersion of a plurality of metal oxide nanoparticles, the intervening dispersion uniformly distributed around the titanium dioxide particles;
wherein the first average particle size is about 120 nm and the second average particle size is about 50 nm.

\* \* \* \* \*